(12) United States Patent
Thompson

(10) Patent No.: US 7,536,510 B1
(45) Date of Patent: May 19, 2009

(54) HIERARCHICAL MRU POLICY FOR DATA CACHE

(75) Inventor: Stephen P. Thompson, Longmont, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 333 days.

(21) Appl. No.: 11/242,578

(22) Filed: Oct. 3, 2005

(51) Int. Cl.
*G06F 12/00* (2006.01)

(52) U.S. Cl. .................... 711/128; 711/119; 711/120; 711/129; 711/132

(58) Field of Classification Search ............... None
See application file for complete search history.

(56) References Cited

U.S. PATENT DOCUMENTS 6,317,351 B2 * 11/2001 Choi et al. ............ 365/49.17
6,718,439 B1 * 4/2004 Jayavant ................ 711/136
2004/0030838 A1 * 2/2004 van de Waerdt ........ 711/137

* cited by examiner

*Primary Examiner*—Kevin L Ellis
*Assistant Examiner*—Alan M Otto

(57) ABSTRACT

A cache read request is received at a cache comprising a plurality of data arrays, each of the data arrays comprising a plurality of ways. Cache line data from each most recently used way of each of the plurality of data arrays is selected in response to the cache read request and selecting a first data of the received cache line data from the most recently used way of the cache. An execution of an instruction is stalled if data identified by the cache read request is not present in the cache line data from the most recently used way of the cache. A second data from a most recently used way of one of the plurality of data arrays other than the most recently used data array is selected as comprising data identified by the cache read request. The second data is provided for use during the execution of the instruction.

16 Claims, 3 Drawing Sheets

HIERARCHICAL MRU POLICY FOR DATA CACHE

FIELD OF THE DISCLOSURE

The present disclosure relates generally to data caching in processing systems.

BACKGROUND

Set associative data cache having multiple ways frequently are used in processing systems to cache data from memory for use during instruction execution. In an effort to reduce power consumption, techniques have been developed that implement a most recently used (MRU) policy whereby the most recently used way of the cache is read in parallel with the cache tags in response to a cache read request. If the most recently used way is identified as having the requested data, the cache access terminates and the requested data is provided to the execution pipeline. However, if the most recently used way does not have the requested data, the execution pipeline stalls and the cache proceeds with a normal cache lookup based on an analysis of the cache tag array. If there is a cache hit, the cache is read with typically at least a two-clock stall that occurs because the tag analysis results typically are not available in time to issue the cache read for the clock edge following the read of the most recently used way. If there is a cache miss, the processing system continues to stall while a memory other than the case is accessed to obtain the requested data. This conventional technique generally results in reduced power consumption compared to other techniques that generally power all ways of the cache during a cache access because only one way is powered if there is a hit on the most recently used way or only two ways are powered if there is a cache hit on the non-most recently used way. However, as discussed above, a miss on the most recently used way typically results in at least a two clock delay that frequently would not occur in other conventional techniques. Accordingly, an improved technique for processing cache read requests would be advantageous.

BRIEF DESCRIPTION OF THE DRAWINGS

The purpose and advantages of the present disclosure will be apparent to those of ordinary skill in the art from the following detailed description in conjunction with the appended drawings in which like reference characters are used to indicate like elements, and in which.

DETAILED DESCRIPTION OF THE DISCLOSURE

Figure 1:
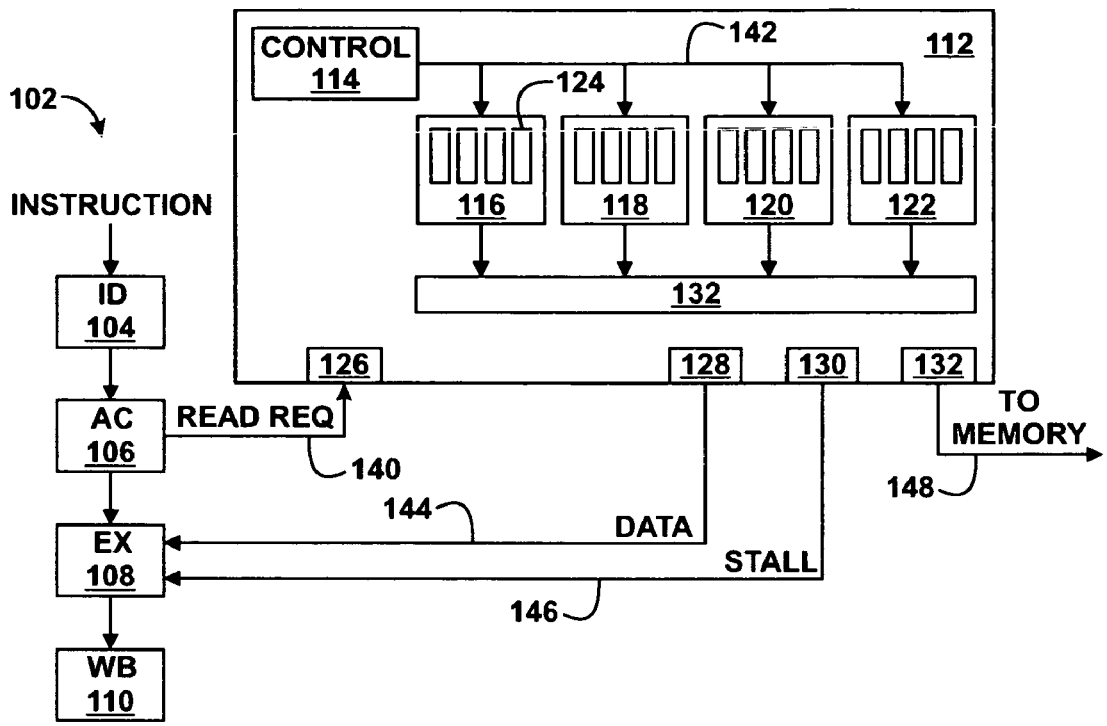
FIG. 1 is a block diagram illustrating an exemplary processing system utilizing a hierarchical most recently used (MRU) data cache policy in accordance with at least one embodiment of the present disclosure.

The following description is intended to convey a thorough understanding of the present disclosure by providing a number of specific embodiments and details involving the processing of cache read requests based on a hierarchical most recently used (MRU) policy. It is understood, however, that the present disclosure is not limited to these specific embodiments and details, which are exemplary only. It is further understood that one possessing ordinary skill in the art, in light of known systems and methods, would appreciate the use of the disclosure for its intended purposes and benefits in any number of alternative embodiments, depending upon specific design and other needs.

In accordance with one aspect of the present disclosure, a method is provided. The method includes receiving a cache read request at a cache including a plurality of data arrays, each of the data arrays including a plurality of ways. The method further includes selecting cache line data from each most recently used way of each of the plurality of data arrays in response to the cache read request and selecting a first data of the received cache line data from the most recently used way of the cache. The method additionally includes stalling an execution of an instruction if data identified by the cache read request is not present in the cache line data from the most recently used way of the cache. The method further includes selecting a second data from a most recently used way of one of the plurality of data arrays other than the most recently used data array as including data identified by the cache read request and providing the second data for use during the execution of the instruction.

In accordance with another aspect of the present disclosure, a cache is provided. The cache includes a plurality of data arrays, each data array including a plurality of ways. The cache further includes a first input to receive a cache read request, a first output and a second output coupled to an execution unit of a processor, and a cache controller coupled to the plurality of data arrays and the first input. The cache controller is to select cache line data from each most recently used way of each of the plurality of data arrays in response to the cache read request and select a first data of the received cache line data from the most recently used way of the cache. The cache controller further is to provide a stall signal to the first output for stalling the execution unit if data identified by the cache read request is not present in the cache line data from the most recently used way of the cache and select a second data from a most recently used way of one of the plurality of data arrays other than the most recently used data array as including the data identified by the cache read request. The cache controller additionally is to provide the second data to the second output for use by the execution unit during the execution of the instruction.

In accordance with yet another aspect of the present disclosure, a system is provided. The system includes a first input to receive a cache read request and a plurality of data arrays. Each data array includes a plurality of ways and each data array is to output data stored at the most recently used way of the data array in response to the cache read request. The system further includes a most recently used array module coupled to the first input and to the plurality of data arrays. The most recently used array module is to store information identifying the most recently used way of each of the plurality of data arrays and provide a way select signal in response to the cache read request. Each way select signal indicates the most recently used way of the corresponding data array. The system further includes a buffer module including a plurality of latches, each latch to latch the cache line data output from a corresponding data array. The system also includes a multiplexer. The multiplexer includes a mux select input to receive the mux select signal and a plurality of data array inputs. Each data array input receives the cache line data from a corresponding data array. The multiplexer further includes a plurality of latch inputs, each latch input to receive the output of a corresponding latch, and an output to provide data selected from one of the plurality of data array inputs and the plurality of latch inputs based on the mux select signal. The system further includes a stall control module coupled to the most recently used array module. The stall control module is to provide a stall signal to stall an execution of an instruction if data identified by the cache read request is not present in the cache line data from the most recently used way of the cache. The most recently used array module further is to select a most recently used way of one of the plurality of data arrays other than the most recently used data array as including the data identified by the cache read request if the data identified by the cache read request is not present in the cache line data from the most recently used way of the cache. The most recently used array module further is to provide the mux select signal based on the identified most recently used way.

FIGS. 1-4 illustrate exemplary techniques for processing cache access requests at a cache. In at least one embodiment, the cache includes a plurality of ways, where the ways are allocated to a plurality of separately-accessible data arrays so that each data array has a subset of the plurality of ways. In response to a cache access request, each data array outputs the data stored in its most recently used way. The cache identifies the most recently used data array and provides its output to an execution pipeline. Thus, the cache identifies and outputs the data stored at the most recently used way of the cache (i.e., the most recently used way of the most recently used data array). Substantially in parallel, a cache tag lookup is performed to determine whether the requested data is present in the cache, and if so, which way it is located in. If it is located in the most recently used way of the cache, this data is already available to the execution pipeline and the cache therefore can signal that the available data is the correct data for use by the pipeline by, for example, deasserting a stall signal used to temporarily stall the pipeline.

If, however, the cache tag lookup indicates that the requested data is not in the most recently used way of the cache but is in the most recently used way of one of the other data arrays, the cache can then direct the output from the other identified data array to the execution pipeline and signal that the available data is the correct data for use by the pipeline. Further, if the requested data is in the cache but not in any of the most recently used ways, the cache can continue to stall the execution pipeline while directing the data array having the identified way to output the data in the identified way and then provide this output to the execution pipeline. The cache then can signal that the available data is the correct data for use by the pipeline. However, if the requested data is not stored at the cache in any of the ways, the cache can provide an indication to the execution pipeline and memory access request can be initiated to obtain the data from another memory location, such as system memory or another buffer.

Referring to FIG. 1, an exemplary processing system 100 utilizing a hierarchical MRU data cache policy is illustrated in accordance with at least one embodiment of the present disclosure. As depicted, the processing system 100 includes an instruction execution pipeline 102 having an instruction decode (ID) module 104, an address calculation (AC) module 106, an execution (EX) module 108, and a write back (WB) module 110. The processing system 100 further includes a cache 112 used to store data from another buffer or memory (not shown), such as a higher level cache or system random access memory (RAM). For ease of illustration, the cache 112 is described herein as a data cache. However, the techniques described herein may be applied to other types of caches or other buffers, such as instruction caches or unified caches, without departing from the scope of the present disclosure.

The cache 112 includes a control module 114 having a plurality of ways allocated among a plurality of data arrays, such as data arrays 116, 118, 120 and 122 such that each data array is an individually-accessible set associative data array having a subset of the plurality of ways of the cache. In the illustrated example, the cache 112 is a sixteen-way set associative cache having four data arrays, so that each data array has a four of the sixteen ways of the cache 112.

The cache 112 further includes an input 126 connected to the AC module 106 to receive data or other information associated with a cache read request signal 140 provided by the AC module 106. The cache 112 further may include an output 128 connected to the EX module 108 to provide cached data and an output 130 connected to the EX module 108 to provide a stall signal 146 used to stall execution operations of the pipeline 102. The cache 112 further may include an output 132 to provide a memory access request signal 148 to another memory system, such as a higher level cache, system memory, a buffer, or the like, to request data not present in the cache 112. As shown, the cache 112 further includes a buffer module 132 having inputs connected to the outputs of the data arrays 116, 118, 120 and 122 and an output connected to the output 128 for providing data from one or more of the data arrays 116, 118, 120 and 122.

In operation, the execution pipeline 102 receives, processes and executes instructions, whereby stored data utilized by these instructions may be obtained from the cache 112, if available, or from another buffer or memory if the requested data is not cached. During processing, an instruction is decoded at the ID module 104 and provided to the AC module 106 for address calculation. In the event that the instruction requires the use of stored data, the AC module 106 provides a cache read request signal 140 to the cache 112 in an attempt to obtain the requested data.

In response to the receipt of the cache read request signal 140, the control module 114 directs each of the data arrays 116, 118, 120 and 120 to output the contents of the corresponding cache line at its most recently used way to the buffer module 132, where it is latched. Concurrently, the control module 114 identifies the most recently used way of the entire cache 112 (i.e., the most recently used way of the most recently used data array) and signals the buffer module 132 to initially output the data received from the identified most recently used data array to the output 132. Thus, in this example, the data stored at the most recently used way of the entire cache 112 can be prepared for provision to the EX module 108 before it has been resolved that the requested data is in the cache 112 at all, much less whether it is in the most recently used way of entire cache 112.

At approximately the same time as the MRU read process described above, the control module 114 performs a cache tag lookup to determine whether the requested data is stored in the cache 112, and in particular, in which way of the cache 112 the requested data is stored. In the event that the requested data is present in the most recently used way of the entire cache 112, the control module 114 signals the EX module 108 that the data initially output by the buffer module 132 (i.e., the contents of the most recently used way of the entire cache 112) is valid for use. This signal can include, for example, deasserting the stall signal 146 so as to indicate the validity of the data at the output 128. Accordingly, if the requested data is in the most recently used way of the entire cache 112, this data can be ready for provision to the EX module 108 before or at approximately the same time as the resolution of the cache tag lookup, typically resulting in no stalling of the EX module 108.

However, if the most recently used way of the entire cache 112 does not contain the requested data, the control module 114 asserts the stall signal 146 in order to stall the execution pipeline 102. If the cache tag lookup indicates that the requested data is present in one of the most recently used ways other than the most recently used ways of the entire cache 112, the control module 114 identifies the corresponding data array and directs the buffer module 132 to output the latched data from the identified data array to the EX module 108 via the output 128, at which time the control module 114 can deassert the stall signal 146 so as to restart the execution pipeline 102. Accordingly, if the requested data is not in the most recently used way of the entire cache 112 but instead is in the most recently used way of another data array and thereby stored at the buffer module 132, relatively little stalling occurs at the EX module 108 (typically only requiring a stall of a single clock cycle).

In the event that the requested data is not in any of the most recently used ways of the plurality of data arrays 116, 118, 120 and 122 (e.g., not at buffer module 132), but is in another way of one of the data arrays, the control module 114 continues to assert the stall signal 146 and directs the data array containing the requested data to output the data from the identified way of the corresponding data array to the buffer module 132. The control module 114 then directs the buffer module 132 to output this data to the EX module 108 via the output 128 and deasserts the stall signal 146 so as to restart the EX module 108.

Further, if the requested data is not present in any of the ways of the cache 112, the cache 112 can provide a memory access request signal 148 to an alternate storage location, such as system memory or another buffer, in an attempt to obtain the requested data from the memory or other buffer. Alternately, another component of the processing system 100 can initiate and manage the memory access request. For example, the cache 112 can provide a signal to the AC module 106 indicating that there was a cache miss. In response, the AC module 106 can initiate a memory access request to system memory or another buffer.

Upon receipt of the data 144 from the cache 112 or from memory or another buffer, and upon the deassertion of the stall signal 146, if previously asserted, the EX module 108 executes the instructions currently being processed using the data 144 and provides the results to the write back module 110.

Figure 2:
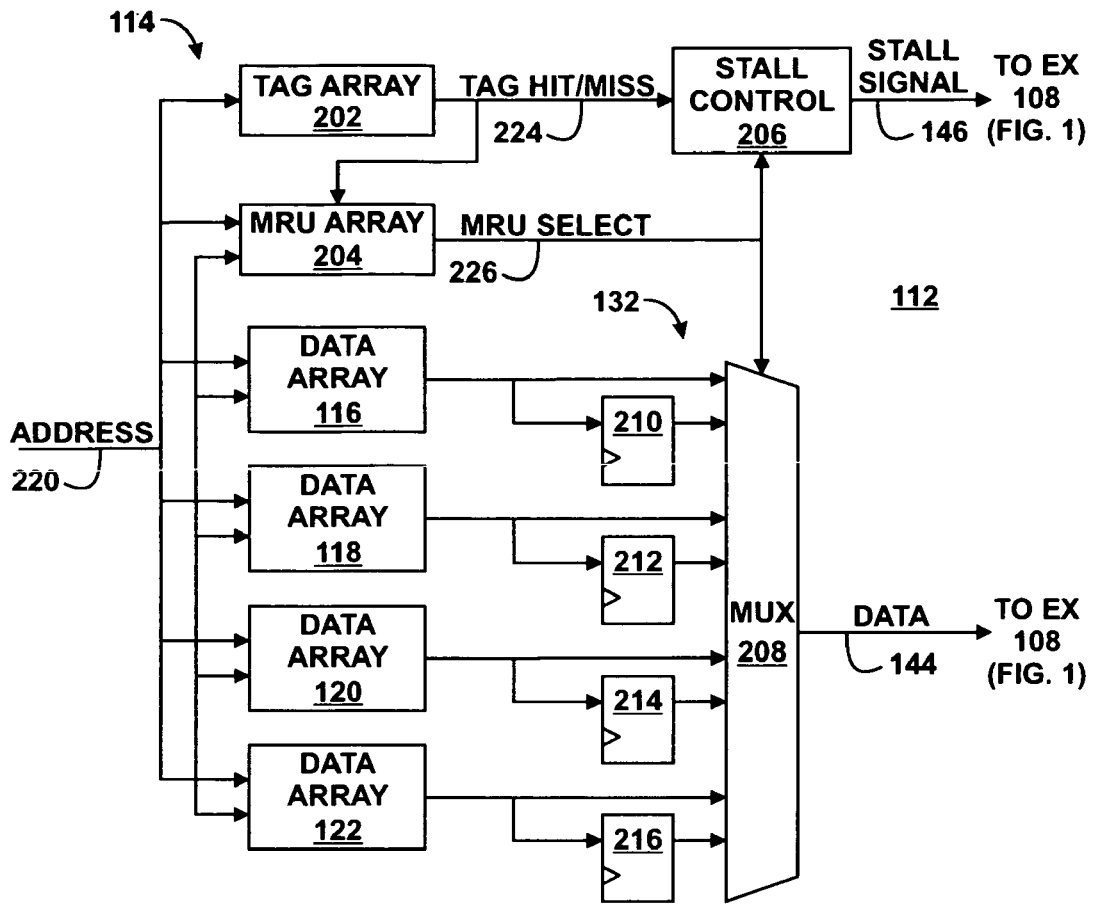
FIG. 2 is a block diagram illustrating an exemplary data cache of the processing system of FIG. 1 in accordance with at least one embodiment of the present disclosure.

Referring to FIG. 2, an exemplary implementation of the cache 112 of FIG. 1 is illustrated in accordance with at least one embodiment of the present disclosure. As discussed above, the cache 112 includes a control module 114, a plurality of data arrays having a plurality of ways, such as data arrays 116, 118, 120 and 122, and a buffer module 132. As exemplary illustrated, the control module 114 includes a tag array module 202, a MRU array module 204, and a stall control module 206.

The tag array module 202 includes an input to receive address 220 and a cache tag array (not shown) that stores the cache tag information for the data arrays 116, 118, 120, and 122. The tag array module 202 further includes an output to provide tag hit/miss signal 224 in response to a cache tag lookup using the address 220 and the cache tag array. In one embodiment, the tag hit/miss signal 224 indicates whether there is a cache hit or cache miss, and if there is a cache miss, in which way of the cache 112 the requested data is stored.

The MRU array 204 includes an input to receive the address 220, an input to receive the tag hit/miss signal 224, and an MRU array (not shown) that maintains MRU information for the data arrays 116, 118, 120, and 122. The MRU array module 204 also is connected to or has access to the data arrays 116, 118, 120 and 122 so as to monitor accesses to the data arrays so as to maintain MRU information for each data array. The MRU array, in one embodiment, stored information that can be used to identify both the most recently used way of each data array as well as the most recently used way of the entire cache 112. The MRU array module 204 further includes an output to provide an MRU select signal 226 based on information stored at the MRU array. The MRU select signal 226, in one embodiment, includes an indication of the data array/way selected for output by the buffer module 132.

The stall control module 206 includes an input to receive the tag hit/miss signal 224, an input to receive the MRU select signal 226 and an output to provide the stall control signal 146. The stall control module 206, in one embodiment, compares information represented by the tag hit/miss signal 224 and the MRU select signal 226 to determine whether the way selected for output by the buffer module 226 is the way of the cache 112 that contains the requested data (if at all) and asserts or deasserts the stall signal 146 accordingly so as to indicate whether the output data 144 is valid for use.

In the illustrated example, the buffer module 132 includes a multiplexer 208 and a plurality of output latches 210, 212, 214 and 216, each output latch having an input connected to the output of a corresponding data array and an output connected to a corresponding input of the multiplexer 208. The multiplexer 208 includes additional inputs, each connected to the output of a corresponding data array. The multiplexer 208 further includes a control input to receive the MRU select signal 226 and an output connected to the output 128 (FIG. 1) of the cache 112.

In response to a cache read request from the AC module 106 (FIG. 1), the address value 220 associated with the cache read request is provided to the tag array module 202, the MRU module 204 and the data arrays 116, 118, 120 and 122. The tag array module 202 utilizes the address value 220 to perform a cache tag lookup to determine whether the requested data is stored in any of the data arrays 116, 118, 120 or 122. Substantially in parallel, the MRU array module 204 directs each of the data arrays 116, 118, 120 and 122 to output the data stored in the most recently used way of the cache line identified by the address 220. The output data from each of the data arrays 116, 118, 120 and 122 is latched at the output latches 210, 212, 214 and 216, respectively, and also is provided as an input to the multiplexer 208.

Before or in parallel with the cache tag lookup, the MRU array module 204 uses its MRU array to identify the most recently used data array of the cache 112 and configures the MRU select signal 226 based on the identified data array. In response, the multiplexer 208 selects the input data provided by the identified data array for output. Upon resolution of the cache tag lookup, the tag array module 202 configures the tag hit/miss signal 224 to reflect whether there is a cache hit or miss and further to indicate the location of the requested data in the cache.

The stall control module 206 compares the identified location represented by the tag hit/miss signal 224 with the most recently used way of the cache 112 represented by the MRU select 226. If the comparison indicates that the most recently used way of the cache 112 contains the identified location, the stall control 206 deasserts the stall signal 146 so as to indicate to the EX module 108 (FIG. 1) that the initial data output by the multiplexer 208 is valid data and that the EX module 108 can proceed. If the comparison indicates that the identified location is not in the most recently used way of the cache 112, the stall control module 206 asserts stall signal 146 so as to indicate to the EX module 108 that the initial data is not valid and to further stall the EX module 108 until the requested data can be provided.

Similarly, the MRU array module 204 compares the identified location represented by the tag hit/miss signal 224 with its MRU array. If the comparison indicates that the most recently used way of the cache 112 does not contain the requested data, the MRU array module 204 uses the MRU array to determine if the most recently used way of one of the other data arrays contains the identified location. If so, the MRU array 204 configures the MRU select 226 to identify the other data array having a most recently used way with the requested data. In response, the multiplexer 208 selects the input connected to the output latch associated with the other data array for output to the EX module 108. The stall control module 206 again performs the comparison of the MRU select 226 and the tag hit/miss signal 224. Because the MRU select signal 226 and the tag hit/miss signal 224 both identify the same data array in this instance, the stall control module 206 deasserts the stall control signal 146 to indicate that the data output by the multiplexer 208 is valid data for use by the EX module 108 and to restart the EX module 108.

In the event that the requested data is one of the data arrays but not in its most recently used array, the tag array module 202 directs the data array to output the data from the identified way and the MRU array module 204 configures the MRU select signal 226 so as to direct the multiplexer 208 to output the data provided by the identified data array. The stall control module 206, after comparing the signals 224 and 226, deasserts the stall signal 146 and the EX module 108 restarts with the data provided by the multiplexer 208. In the event that the cache tag lookup indicates that the requested data is not present in any of the data arrays 116, 118, 120 or 122, a memory access request to another buffer (e.g., a higher level cache) or memory can be initiated.

Figure 3:
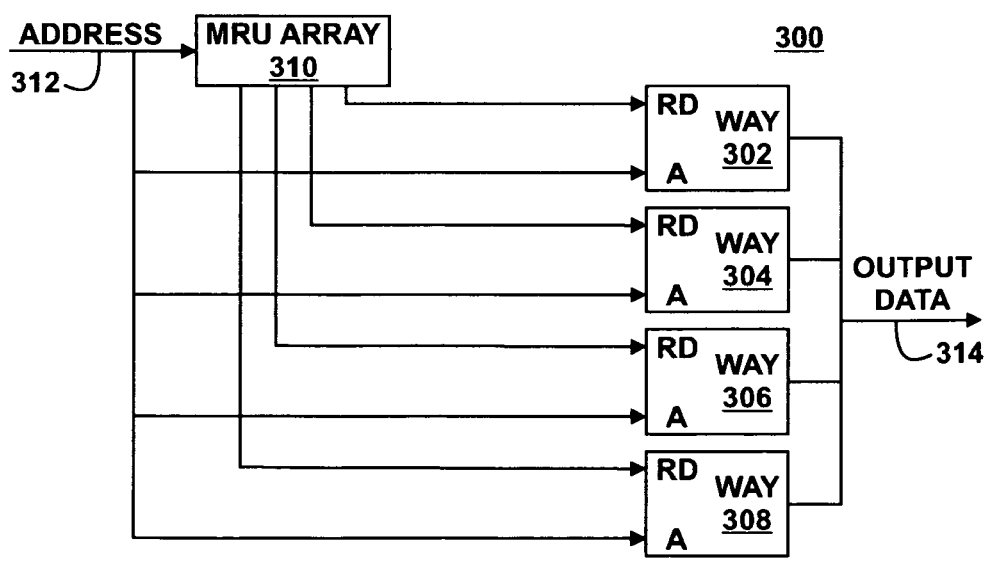
FIG. 3 is a block diagram illustrating an exemplary data array of the data cache of FIG. 2 in accordance with at least one embodiment of the present disclosure.

Referring to FIG. 3, an exemplary data array 300 for use in a data cache utilizing a hierarchical MRU policy is illustrated in accordance with at least one embodiment of the present disclosure. The data array 300 represents, for example, an implementation of the data arrays 116, 118, 120 and 122 of FIG. 2.

As illustrated, the data array 300 includes a plurality of ways 302, 304, 306 and 308, each way having a read input and an address input and an output to provide the data stored at the cache line identified by the address 312 received at the address input in response to an assertion of a read signal received at the read input. The data array 300 further includes a MRU array module 310 having an input to receive the address 312 and also having an MRU array (not shown) for use in identifying the most recently used way of the data cache 300. The data of the MRU arrays of the MRU array module 310 and the MRU array module 204 (FIG. 2) can be synchronized so as to update the MRU information stored by the MRU array 204. The MRU array module 310 further includes a plurality of outputs, each output connected to the read input of a corresponding way.

In response to a signal (not shown) directing the data array 300 to output the data stored in the most recently used way of the cache line identified by the address 312, the MRU array 310 uses its MRU array to identify the most recently used way and asserts its read signal. In response to its asserted read signal, the identified way outputs its data stored at the cache line identified by the address 312. The resulting output data 314 then can be provided to the buffer module 132 (FIG. 1) as discussed above.

Figure 4:
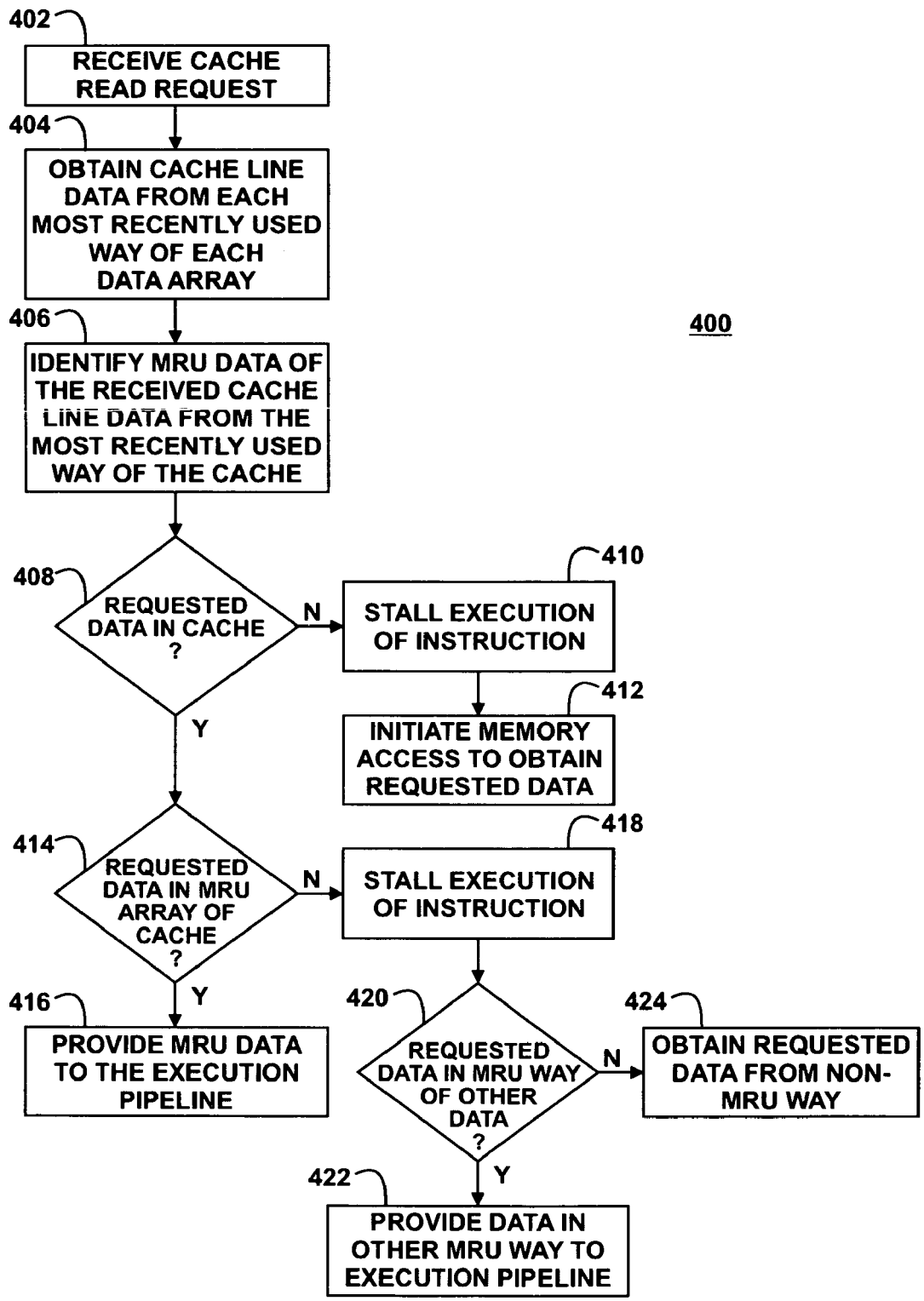
FIG. 4 is a flow diagram illustrating an exemplary hierarchical MRU cache access method in accordance with at least one embodiment of the present disclosure.

Referring to FIG. 4, an exemplary hierarchical MRU cache access method 400 is illustrated in accordance with at least one embodiment of the present disclosure. At block 402, a cache read request is received from an execution pipeline at a set associative cache (e.g., cache 112, FIG. 1) having a plurality of data arrays, each data array having a plurality of ways. At block 404, cache line data is obtained from each most recently used way of each data array. At block 406, the data stored in the most recently used way of the most recently used data array (i.e., the most recently used way of the entire cache) is identified (hereinafter, "MRU data"). At block 408, a cache tag lookup is performed in parallel with the processes represented by blocks 402, 404 and 406 so as to determine whether the cache contains the requested data, and if so, its location. If the requested data is not present in the data cache, the execution pipeline is stalled at block 410 and a memory access is initiated at block 412 so as to obtain the requested data from memory or another buffer.

If the cache tag lookup indicates that the cache has the requested data, at block 414 the identified location is compared with the most recently used way of the most recently used data array to determine if the MRU data includes the requested data. If so, at block 416 the MRU data, or a portion thereof, is provided to the execution pipeline.

If the MRU data does not include the requested data, at block 418 the execution pipeline is stalled. At block 420, the identified location is compared with the most recently used ways of the data arrays other than the most recently used data array to determine if the most recently used way of another data array includes the requested data. If so, at block 422 the data stored at the most recently used way of the identified data array is provided to the execution pipeline and the execution pipeline is restarted. If not, at block 424 the cache accesses the non-most recently used way and the data array identified during the cache tag lookup to obtain the requested data for provision to the execution pipeline.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
  receiving a cache read request at a cache comprising a plurality of ways and a plurality of data arrays, each of the data arrays comprising a different subset of the plurality of ways, each subset comprising two or more ways of the plurality of ways;
  selecting cache line data from each most recently used way of each of the plurality of data arrays in response to the cache read request;
  selecting a first data of the received cache line data from the most recently used way of the most recently used data array of the plurality of data arrays;
  stalling an execution of an instruction if data identified by the cache read request is not present in the first data;
  selecting a second data from a most recently used way of one of the plurality of data arrays other than the most recently used data array as comprising data identified by the cache read request if data identified by the cache read request is not present in the first data; and providing the second data for use during the execution of the instruction.

2. The method of claim 1, further comprising:
providing the first data for use during an execution of the instruction if data identified by the cache read request is present in the first data.

3. The method of claim 1, further comprising:
stalling the execution of the instruction if the data identified by the cache read request is not present in the second data;
selecting a third data from a non-most recently used way of one of the plurality of data arrays as comprising data identified by the cache read request if the data identified by the cache read request is not present in the cache line data from any of the most recently used ways; and
providing the third data for use during the execution of the instruction.

4. The method of claim 1, further comprising:
monitoring access to the cache to identify the most recently used way of each data array.

5. The method of claim 1, further comprising:
determining whether the cache comprises the data identified by the cache read request based on a cache tag lookup performed substantially in parallel with receiving the cache line data and selecting the first data.

6. The method of claim 5, further comprising:
providing a memory read request to a memory if the data identified by the cache read request is determined to be not present in the cache based on the cache tag lookup.

7. A cache comprising:
a plurality of ways;
a plurality of data arrays, each data array comprising a different subset of the plurality of ways, each subset comprising two or more ways of the plurality of ways;
a first input to receive a cache read request;
a first output and a second output coupled to an execution unit of a processor; and
a cache controller coupled to the plurality of data arrays and the first input, wherein the cache controller is to:
select cache line data from each most recently used way of each of the plurality of data arrays in response to the cache read request;
select a first data of the received cache line data from the most recently used way of the most recently used data array of the plurality of data arrays;
provide a stall signal to the first output for stalling the execution unit if data identified by the cache read request is not present in the first data;
select a second data from a most recently used way of one of the plurality of data arrays other than the most recently used data array as comprising the data identified by the cache read request if data identified by the cache read request is not present in the first data; and
provide the second data to the second output for use by the execution unit during the execution of the instruction.

8. The cache of claim 7, wherein the cache controller further is to:
provide the first data to the second output for use by the execution unit if the data identified by the cache read request is present in the first data.

9. The cache of claim 7, wherein the cache controller further is to:
identify a third data from a non-most recently used way of one of the plurality of data arrays as comprising the data identified by the cache read request if the data identified by the cache read request is not present in the cache line data from any of the most recently used ways; and
provide the first data to the second output for use by the execution unit.

10. The cache of claim 7, wherein the cache controller further is to:
monitor access to the cache to identify the most recently used way of each data array.

11. The cache of claim 7, wherein the cache controller is to determine whether the cache comprises the data identified by the cache read request based on a cache tag lookup performed substantially in parallel with receiving the cache line data and selecting the first data.

12. The cache of claim 11, wherein the cache controller further is to:
provide a memory read request to a memory if the data identified by the cache read request is determined to be not present in the cache based on the cache tag lookup.

13. A system comprising:
a first input to receive a cache read request;
a plurality of data arrays, each data array comprising a different subset of a plurality of ways, each subset comprising two or more ways of the plurality of ways and wherein each data array is to output cache line data stored at the most recently used way of the data array in response to the cache read request;
a most recently used array module coupled to the first input and to the plurality of data arrays, wherein the most recently used array module is to:
store information identifying the most recently used way of each of the plurality of data arrays; and
provide a way select signal in response to the cache read request, wherein the way select signal indicates the most recently used way of the corresponding data array; and
a buffer module comprising:
a plurality of latches, each latch to latch the cache line data output from a corresponding data array;
a multiplexer comprising:
a mux select input to receive the way select signal;
a plurality of data array inputs, each data array input to receive the cache line data from a corresponding data array;
a plurality of latch inputs, each latch input to receive the output of a corresponding latch; and
an output to provide data selected from one of the plurality of data array inputs and the plurality of latch inputs based on the mux select signal;
a stall control module coupled to the most recently used array module, wherein the stall control module is to provide a stall signal to stall an execution of an instruction if data identified by the cache read request is not present in the cache line data from the most recently used way of the most recently used data array of the plurality of data arrays;
wherein the most recently used array module further is to:
select a most recently used way of one of the plurality of data arrays other than the most recently used data array as comprising the data identified by the cache read request if the data identified by the cache read request is not present in the cache line data from the most recently used data array of the plurality of data arrays; and
provide the mux select signal based on the identified most recently used way.

14. The system of claim 13, wherein the cache controller further is to:

provide the way select signal based on the most recently used way of the most recently used data array if the data identified by the cache read request is present in the cache line data from the most recently used way of the most recently used data array.

15. The system of claim 13, wherein the stall control module further is to provide a stall signal to stall the execution of the instruction if the data identified by the cache read request is not present in the cache line data from the most recently used way of the most recently used data array and wherein the most recently used array module is to provide the mux select signal based on a non-most recently used way of one of the plurality of data arrays as comprising data identified by the cache read request if the data identified by the cache read request is not present in the cache line data from any of the most recently used ways.

16. The system of claim 13, further comprising:
a tag array module having an input to address information associated with the cache read request and an output coupled to the stall control module, wherein the tag array module is to determine whether the cache comprises the data identified by the cache read request based on a cache tag lookup using the address information.

* * * * *